(12) United States Patent
Maeng et al.

(10) Patent No.: US 11,660,563 B2
(45) Date of Patent: May 30, 2023

(54) APPARATUS FOR COLLECTING BY-PRODUCT AND METHOD FOR COLLECTING BY-PRODUCT

(71) Applicant: Samsung Electronics Co., Ltd., Suwon-si (KR)

(72) Inventors: Seoyoung Maeng, Seoul (KR); Iljun Jeon, Hwaseong-si (KR); Suji Gim, Hwaseong-si (KR); Youngseok Roh, Suwon-si (KR); Jongyong Bae, Hwaseong-si (KR); Jungjoon Pyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/380,109

(22) Filed: Jul. 20, 2021

(65) Prior Publication Data
US 2022/0143543 A1   May 12, 2022

(30) Foreign Application Priority Data
Nov. 9, 2020   (KR) .................. 10-2020-0148649

(51) Int. Cl.
*B01D 50/20* (2022.01)
*B01D 45/16* (2006.01)
*B01D 46/48* (2006.01)
*B01D 46/42* (2006.01)
*B01D 45/08* (2006.01)

(52) U.S. Cl.
CPC ............. *B01D 50/20* (2022.01); *B01D 45/08* (2013.01); *B01D 45/16* (2013.01); *B01D 46/4263* (2013.01); *B01D 46/48* (2013.01); *B01D 2279/51* (2013.01)

(58) Field of Classification Search
CPC ........ B01D 50/20; B01D 45/08; B01D 45/16; B01D 46/4263; B01D 46/48; B01D 2279/51

See application file for complete search history.

(56) References Cited

U.S. PATENT DOCUMENTS

| | | | |
|---|---|---|---|
| 6,156,107 A * | 12/2000 | Hayashi | B01D 45/08 438/905 |
| 6,966,936 B2 | 11/2005 | Yamasaki et al. | |
| 8,512,452 B2 | 8/2013 | Fischer et al. | |

(Continued)

FOREIGN PATENT DOCUMENTS

| KR | 1020060085357 A | 7/2006 |
|---|---|---|
| KR | 100676927 B1 | 2/2007 |

(Continued)

*Primary Examiner* — Dung H Bui
(74) *Attorney, Agent, or Firm* — Muir Patent Law, PLLC

(57) ABSTRACT

An apparatus for collecting a by-product, includes: a chamber provided with a gas inlet and a gas outlet and having an internal space; a heater disposed on the gas inlet side of the internal space within the chamber and varying a heating temperature in time series; a vortex forming member disposed around the heater; a plurality of first collecting members disposed below the heater; a second collecting member disposed below the first collecting member so that a plurality of second collecting members intersect each other; and a third collecting member disposed on the gas outlet side of the internal space within the chamber.

19 Claims, 11 Drawing Sheets

(56) References Cited

U.S. PATENT DOCUMENTS

| | | |
|---|---|---|
| 2002/0081240 A1 | 6/2002 | Kim |
| 2006/0162862 A1 | 7/2006 | Park |
| 2007/0107595 A1 | 5/2007 | Na |
| 2009/0107091 A1* | 4/2009 | Cho .................... C23C 16/4412 55/440 |
| 2019/0194804 A1* | 6/2019 | Cho .................... C23C 16/4412 |
| 2020/0164296 A1* | 5/2020 | Cho .................. H01L 21/67017 |
| 2020/0217559 A1* | 7/2020 | Hwang ..................... F24H 3/00 |
| 2020/0321226 A1* | 10/2020 | Cho ........................ B01D 51/02 |
| 2021/0039034 A1* | 2/2021 | Cho ..................... B01D 45/08 |
| 2021/0134621 A1* | 5/2021 | Cho .................... C23C 16/4412 |

FOREIGN PATENT DOCUMENTS

| | | |
|---|---|---|
| KR | 100693475 B1 | 4/2007 |
| KR | 100858046 B1 | 9/2008 |
| KR | 1020090039018 A | 4/2009 |
| KR | 100896025 B1 | 5/2009 |

* cited by examiner

APPARATUS FOR COLLECTING BY-PRODUCT AND METHOD FOR COLLECTING BY-PRODUCT

CROSS-REFERENCE TO RELATED APPLICATION(S)

This application claims benefit of priority under 35 U.S.C. § 119 to Korean Patent Application No. 10-2020-0148649, filed on Nov. 9, 2020, in the Korean Intellectual Property Office, the disclosure of which is incorporated by reference herein in its entirety.

BACKGROUND

The present inventive concept relates to an apparatus for collecting a by-product and a method for collecting a by-product.

During a semiconductor process, gas is used to deposit a metal thin film in a deposition process. However, an amount thereof used in the deposition process is low, and most of the gas is discharged from an exhaust pipe.

Accordingly, when a proper treatment is not performed in the exhaust pipe, by-products are generated in the exhaust pipe, and in severe cases, the exhaust pipe is blocked by the generated by-products. In order to prevent this, an apparatus for collecting a by-product connected to the exhaust pipe is required.

However, there is a problem in that the process interruptions frequently occur due to maintenance and repair work requiring cleaning by removing the collected by-products from the apparatus for collecting by-products.

SUMMARY

An aspect of the present inventive concept is to provide an apparatus for collecting a by-product capable of reducing process interruptions for maintenance and repair, and a method for collecting a by-product.

According to an aspect of the present inventive concept, an apparatus for collecting a by-product includes: a chamber provided with a gas inlet and a gas outlet and having an internal space within the chamber; a heater disposed on a gas inlet side of the internal space within the chamber and configured to vary a heating temperature in time series; a vortex forming member disposed around the heater; a plurality of first collecting members disposed below the heater; a plurality of second collecting members disposed below the first collecting members, the second collecting members intersecting each other; and a third collecting member disposed on a gas outlet side of the internal space within the chamber.

According to an aspect of the present inventive concept, an apparatus for collecting a by-product includes: a chamber provided with a gas inlet and a gas outlet and having an internal space; a heater disposed on a gas inlet side of the internal space within the chamber and configured to vary a heating temperature in time series; and a plurality of collecting members disposed below the heater.

According to an aspect of the present inventive concept, a method for collecting a by-product, comprising: preheating a heater; introducing gas into a chamber; driving the heater while varying a heating temperature by the heater disposed in the chamber in time series; and blocking introduction of the gas and stopping driving of the heater.

BRIEF DESCRIPTION OF DRAWINGS

The above and other aspects, features, and advantages of the present inventive concept will be more clearly understood from the following detailed description, taken in conjunction with the accompanying drawings, in which like numerals refer to like elements throughout. In the drawings.

DETAILED DESCRIPTION

Hereinafter, preferred example embodiments of the present inventive concept will be described with reference to the accompanying drawings.

Figure 1:
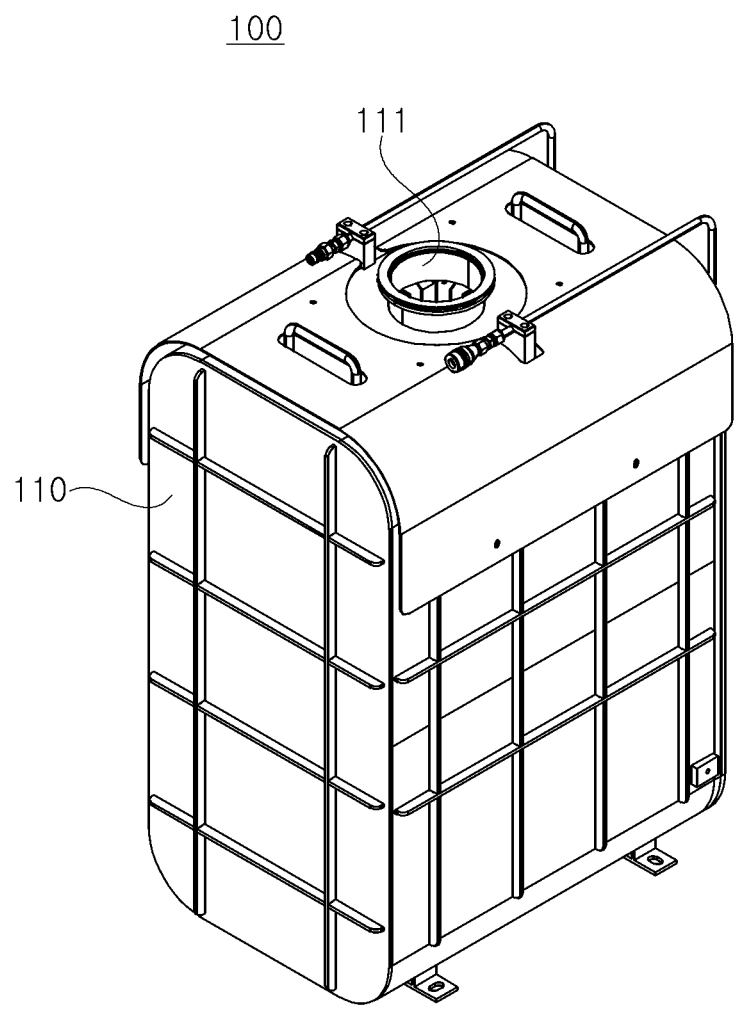
FIG. 1 is a perspective view illustrating an apparatus for collecting a by-product, according to an example embodiment.
Figure 2:
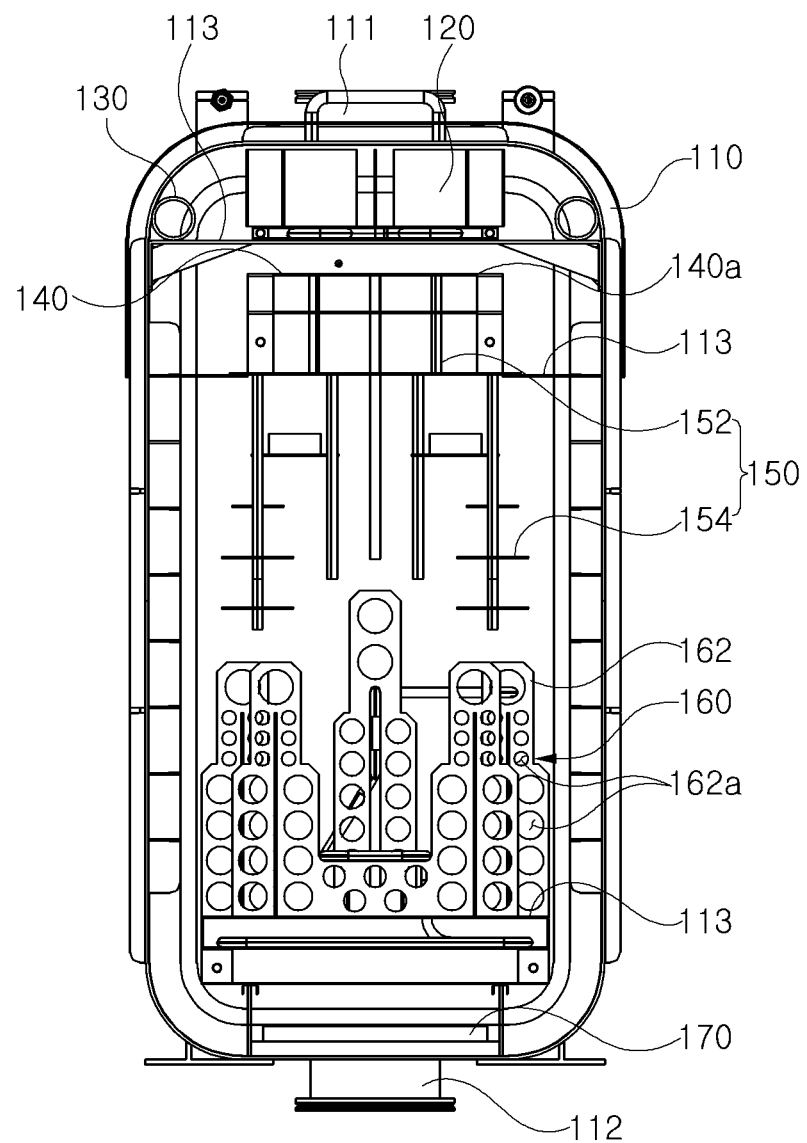
FIG. 2 is a block diagram illustrating an apparatus for collecting a by-product, according to an example embodiment.

FIG. 1 is a perspective view illustrating an apparatus for collecting a by-product according to an example embodiment, and FIG. 2 is a block diagram illustrating an apparatus for collecting a by-product according to an example embodiment.

Referring to FIGS. 1 and 2, an apparatus for collecting a by-product 100 may be configured to include, for example, a chamber 110, a heater 120, a vortex forming member 130, a heat shielding plate 140, a first collecting member 150, a second collecting member 160, and a third collecting member 170.

Figure 4:
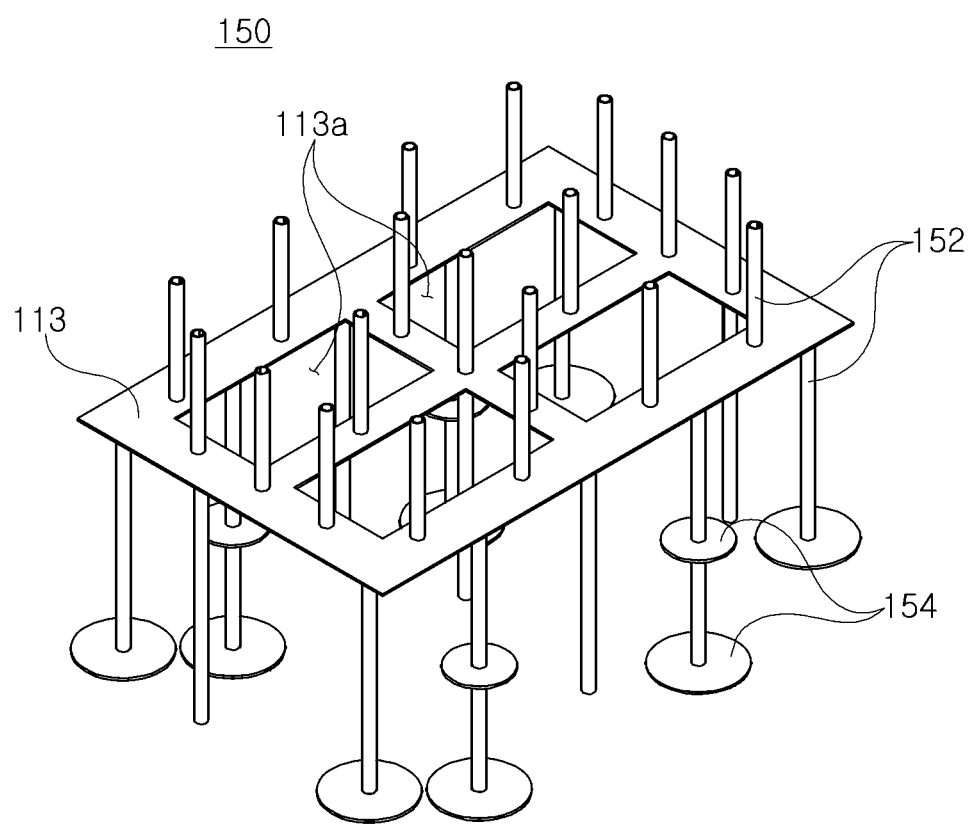
FIG. 4 is a perspective view illustrating a first collecting member of an apparatus for collecting a by-product, according to an example embodiment.
Figure 5:
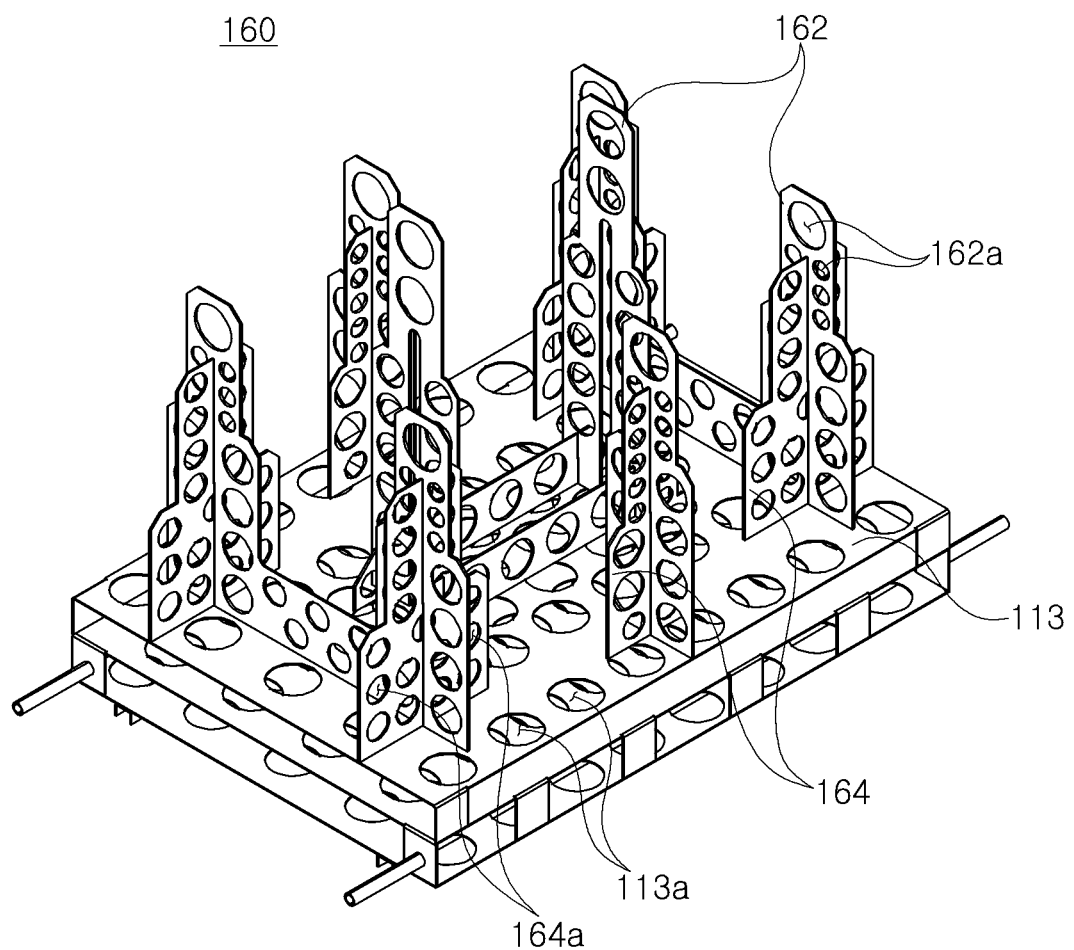
FIG. 5 is a perspective view illustrating a second collecting member of an apparatus for collecting a by-product, according to an example embodiment.

The chamber 110 has an internal space. In addition, the chamber 110 is provided with a gas inlet 111 through which process gas used in a deposition process flows into the chamber 110, and a gas outlet 112 through which gas passing through the internal space within the chamber flows out of the chamber 110. A gas inlet pipe (not shown) and a gas outlet pipe (not shown) may be connected to the gas inlet 111 and the gas outlet 112, respectively. In addition, a pump (not shown) may be connected to the gas outlet pipe so that the gas may flow into the chamber 110 and then flow out. Meanwhile, at least one installation plate 113 may be provided in the chamber 110. The installation plate 113 may be provided with a plurality of openings 113*a* (see FIGS. 4 and 5) to facilitate the flow of gas. The shape and size of the opening 113*a* may vary. Furthermore, various structures may be provided in the internal space within the chamber 110.

The heater 120 is disposed on the gas inlet side of the internal space within the chamber 110. For example, the heater 120 may be disposed within the chamber 110 in a region near or adjacent to the gas inlet 111. The heater 120 may vary a heating temperature in time series. For example, the heater 120 is driven so that the heating temperature is gradually lowered, and a difference in heating temperature varied by the heater 120 may be 50° C. As an example, in an initial operation of collecting by-products, the heating temperature by the heater 120 may be 350° C. In an intermediate operation of collecting by-products, the heating temperature by the heater 120 may be changed to 300° C., and in a final operation of collecting the by-products, the heating temperature by the heater 120 may be 250° C.

Accordingly, by-products are sequentially collected from a lower end portion side of the chamber 110 to an upper end portion side. A detailed description thereof will be described later.

Figure 3:
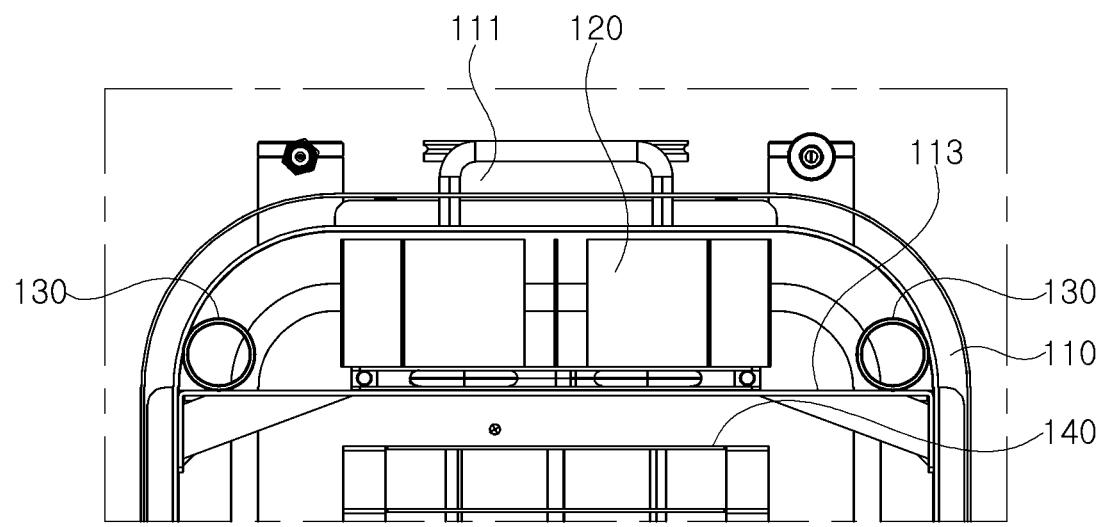
FIG. 3 is an illustrative diagram illustrating a vortex forming member of an apparatus for collecting a by-product, according to an example embodiment.

The vortex forming member 130 is disposed around the heater 120 and may have a circular tubular shape, for example, as shown in more detail in FIG. 3. The vortex forming member 130 serves to form a vortex by cooling gas. To this end, at least a portion of the vortex forming member 130 comes into contact with an inner surface of the chamber 110. Accordingly, since a temperature of the vortex forming member 130 may be lower than that of the incoming gas, a vortex may be formed in the gas flowing into the chamber 110. In addition, since the vortex forming member 130 has a circular tubular shape, the vortex may be formed more easily while the flowing gas flows along a surface of the vortex forming member 130.

The heat shielding plate 140 is disposed below the heater 120 and at least one or more thereof may be provided. The heat shielding plate 140 serves to suppress radiant heat emitted from the heater 120 from flowing to the lower side of the chamber 110.

In addition, the heat shielding plate 140 may be disposed to intersect the flow direction of the flowing gas, and may have a plurality of flow holes 140*a* through which the gas passes. For example, the plurality of flow holes 140*a* may be disposed to form a plurality of pillars and rows, and the plurality of flow holes 140*a* may have the same diameter. However, the present inventive concept is not limited thereto, and the dispositional position and size of the flow hole 140*a* may be variously changed. In other words, the flow holes 140*a* may be irregularly disposed, and a plurality of flow holes 140*a* having different diameters may also be provided.

Meanwhile, in the present example embodiment, a case in which the heat shielding plate 140 is installed below the heater 120 is described as an example, but the present inventive concept is not limited thereto, and the heat shielding plate 140 may be omitted.

A first collecting member 150 is disposed below the heat shielding plate 140, and the plurality of first collecting members 150 are provided. As an example, as shown in more detail in FIG. 4, the first collecting member 150 may include a plurality of pillar portions 152 installed on the installation plate 113 provided in the chamber 110, and a plurality of plates 154 installed on a portion of the plurality of pillar portions 152 to be spaced apart from each other and having different sizes. In some embodiments, the plurality of pillar portions 152 may be disposed such that the longitudinal axis of each of the plurality of pillar portions 152 is perpendicular to a planar surface of the installation plate 113 on which it is installed. A portion of the plurality of plates 154 may have a first diameter, and the remainder of the plurality of plates 154 may have a second diameter, different from the first diameter. However, the present inventive concept is not limited thereto, and the diameter of the plate 154 may be variously changed.

Meanwhile, the pillar portions 152 may be arranged regularly, for example, and a distance between the pillar portions 152, adjacent to each other, may be constant.

As described above, since the first collecting member 150 includes a plurality of pillar portions 152 and a plurality of plates 154 having different sizes, a contact area with gas may be increased. Therefore, collection of by-products can be performed more easily.

The second collecting member 160 is disposed below the first collecting member 150 and may be provided in plural. For example, the second collecting member 160 may be installed on the installation plate 113 provided in the chamber 110. In addition, as shown in more detail in FIG. 5, the second collecting member 160 includes, as an example, a plurality of 2-1 collecting members 162 arranged in a flow direction of the gas, and a plurality of 2-2 collecting members 164 disposed to intersect with the 2-1 collecting members 162. For example, the plurality of 2-1 collecting members 162 may be disposed in a first direction that is perpendicular to a direction that extends from an upper portion to a lower portion of the chamber 110, and the plurality of 2-2 collecting members 164 may be disposed in a second direction that is perpendicular to the first direction. In example embodiments, each of the plurality of 2-1 collecting members 162 and the plurality of 2-2 collecting members 164 may have planar surfaces that are perpendicular to a planar surface of the installation plate 113 on which they are installed. Meanwhile, in order to improve collection efficiency of by-products, the 2-1 collection member 162 and the 2-2 collection member 164 may have various sizes and shapes. The 2-1 collecting member 162 and the 2-2 collecting member 164 may be provided with a plurality of through-holes 162*a* and 164*a* for the flow of gas. Further, the plurality of through-holes 162*a* and 164*a* may be provided with a plurality of types having different diameters.

Meanwhile, the 2-1 collecting member 162 and the 2-2 collecting member 164 may be disposed to intersect each other, and a structure formed by the 2-1 collecting member 162 and the 2-2 collecting member 164 disposed to intersect each other may be disposed so as to be spaced apart from other structures formed by the 2-1 collecting members 162 and the 2-2 collecting members 164.

The third collecting member 170 is disposed on the gas outlet 112 side of the internal space within the chamber 110. For example, the third collecting member 170 may be disposed within the chamber 110 in a region near or adjacent to the gas outlet 112. The third collecting member 170 may serve to remove impurities contained in the gas. As an example, the third collecting member 170 may be a filter for removing impurities composed of fine particles from gas. For example, the impurity may be ammonium chloride ($NH_4Cl$) powder. Accordingly, impurities may be removed from the gas that has passed through the third collecting member 170, and the gas from which the impurities have been removed may be discharged externally of the chamber 110.

As described above, a region in which a collected object is intensively collected through the heater 120 changing a heating temperature in time series from an upper side (e.g., an area within the chamber 110 adjacent to the gas inlet 111) to a lower side (e.g., an area within the chamber 110 adjacent to the gas outlet 112), such that the internal space within the chamber 110 may be effectively used. Accordingly, it is possible to reduce process interruptions due to operations for maintenance and repair work that must be cleaned by removing the collected by-product.

Figure 6:
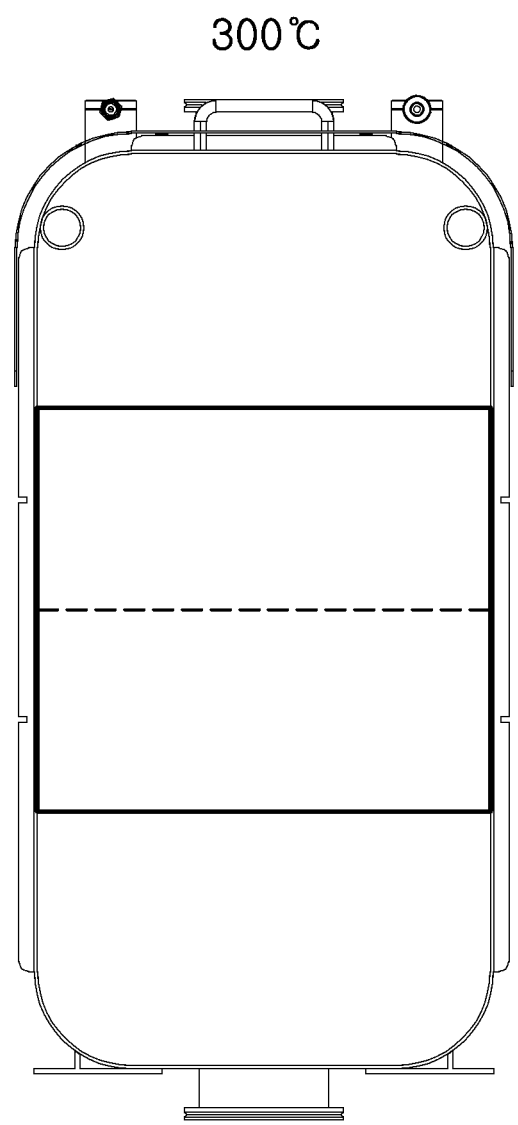
FIG. 6 is an illustrative diagram illustrating a region for collecting a by-product of the apparatus for collecting a by-product, according to the prior art.

Examined in more detail, in the case of heating gas to a single temperature by a heater as in the prior art, as shown in FIG. 6, by-products are intensively collected in a central portion of the chamber. In this case, there is a problem that the internal space within the chamber cannot be used efficiently, and in severe cases, there is a problem that a flow path of gas is blocked by by-products collected in the chamber. Accordingly, there is a problem in that process interruption since the operations for maintenance and repair must be frequently performed.

Figure 7:
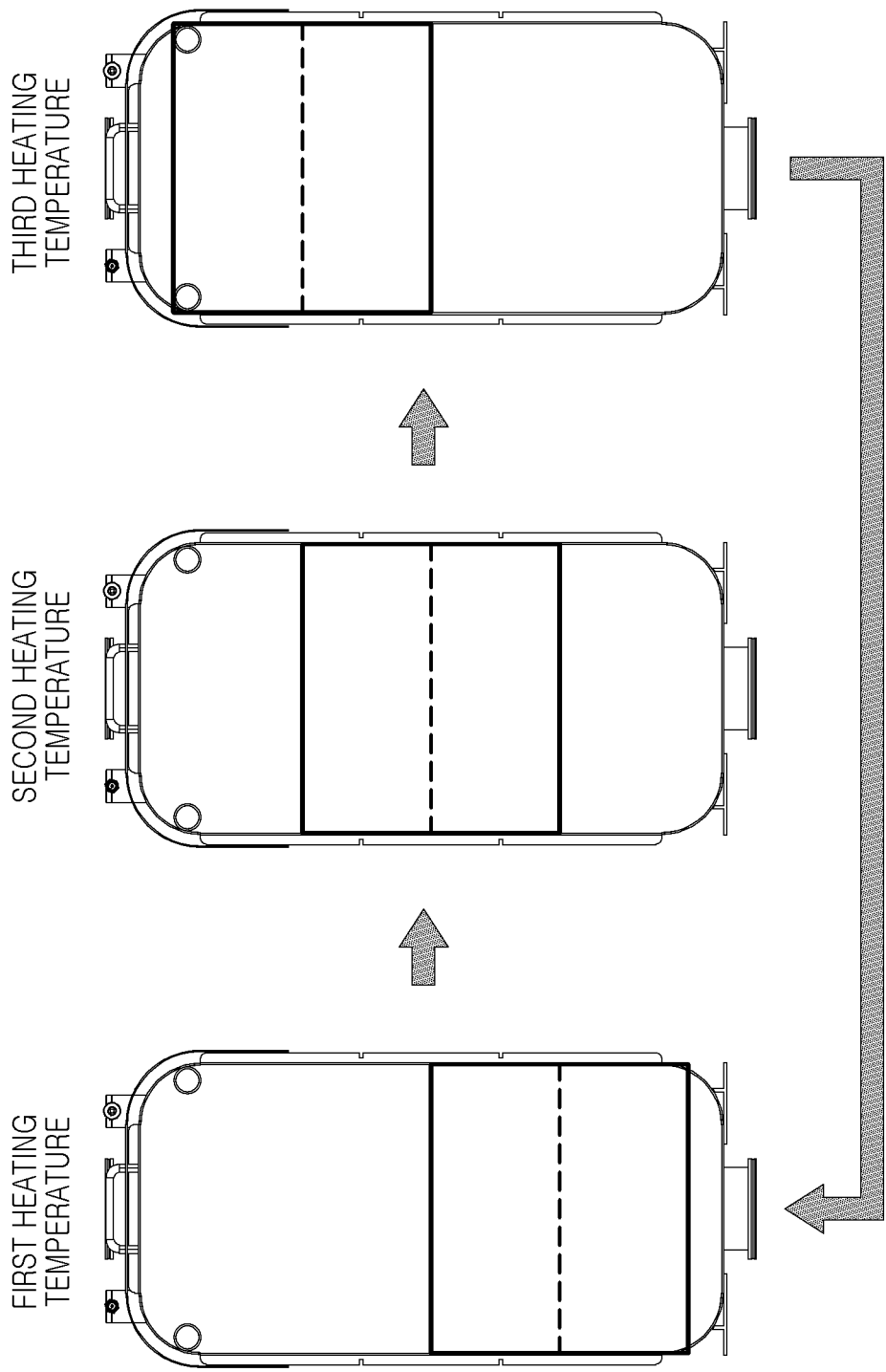
FIG. 7 is an illustrative diagram illustrating a region for collecting a by-product of the apparatus for collecting a by-product, according to an example embodiment.

However, when the gas is heated while varying a heating temperature of a heater, a region in which by-products are intensively collected may be changed. Meanwhile, a range of the heating temperature of the heater may be, for example, 250° C. to 350° C. For example, as shown in FIG. 7, when the heating temperature by the heater is a first heating temperature (e.g., 350° C.), a region in which by-products are intensively collected is formed at a lower end portion of the chamber. In addition, when the heating temperature by the heater is a second heating temperature (e.g., 300° C.), a region in which by-products are intensively collected is formed in a central portion of the chamber. In addition, when the heating temperature by the heater is a third heating temperature (e.g., 250° C.), a region in which by-products are intensively collected is formed at an upper end portion the chamber.

Accordingly, it is possible to efficiently use the internal space within the chamber, and it is possible to reduce the operations for maintenance and repair.

In the above example, the heating temperature is sequentially lowered in increments of 50° C. (e.g., from 350° C., to 300° C., and to 250° C.), but examples are not limited thereto, and the heating temperature and difference in temperatures may be variously changed. For example, the difference in temperatures between the heating temperature and the plurality of heating temperatures may be variously changed according to conditions such as the size of the chamber 110 and the temperature of the incoming gas.

Figure 8:
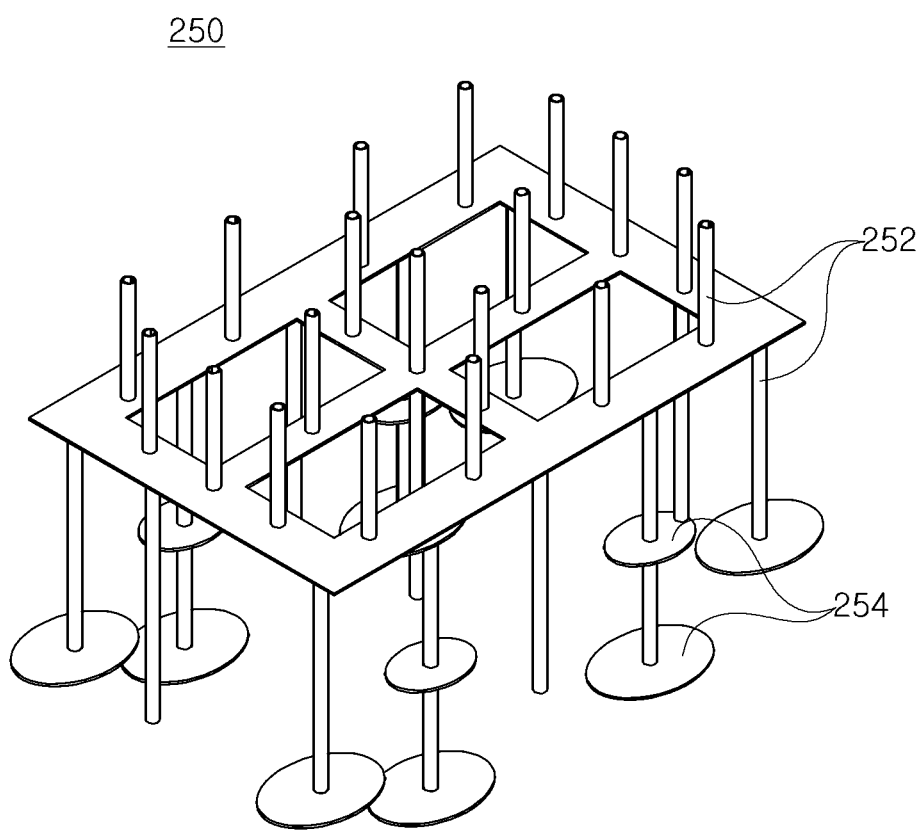
FIG. 8 is a perspective view illustrating a first collecting member of an apparatus for collecting a by-product, according to an example embodiment.

FIG. 8 is a schematic perspective view illustrating a first collecting member of an apparatus for collecting a by-product according to an example embodiment.

Referring to FIG. 8, a first collecting member 250 may include a plurality of pillar portions 252 installed on an installation plate 113 provided in the chamber 110 (see FIG. 1), and a plurality of plates 254 installed on a portion of the plurality of pillar portions 252 to be spaced apart from each other and having different sizes. The plurality of plates 254 may have an elliptical plate shape. In described above, by making the plate 254 have an elliptical shape, it is possible to increase a contact area with gas, thereby improving collection efficiency of by-products.

Figure 9:
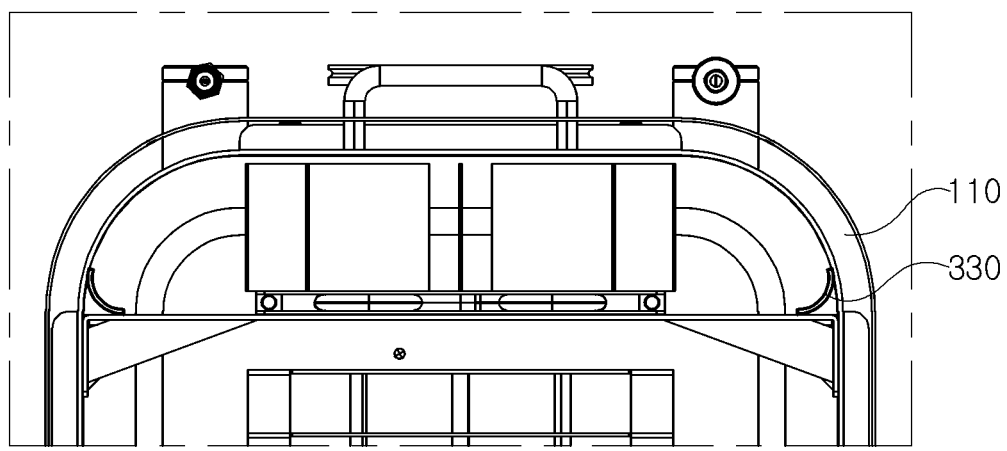
FIG. 9 is an illustrative diagram illustrating a vortex forming member of an apparatus for collecting a by-product, according to an example embodiment.

FIG. 9 is an illustrative diagram illustrating a vortex forming member of an apparatus for collecting a by-product according to an example embodiment.

Referring to FIG. 9, a vortex forming member 330 is disposed around the heater 120 and may have, for example, an arc shape. The vortex forming member 330 serves to form a vortex by cooling gas. To this end, at least a portion of the vortex forming member 330 is in contact with the inner surface of the chamber 110. Accordingly, since a temperature of the vortex forming member 330 may be lower than that of the introduced gas, a vortex may be formed in the gas flowing into the chamber 110. Further, since the flowing gas flows along the vortex forming member 330 having an arc shape, the vortex may be formed more easily.

Figure 10:
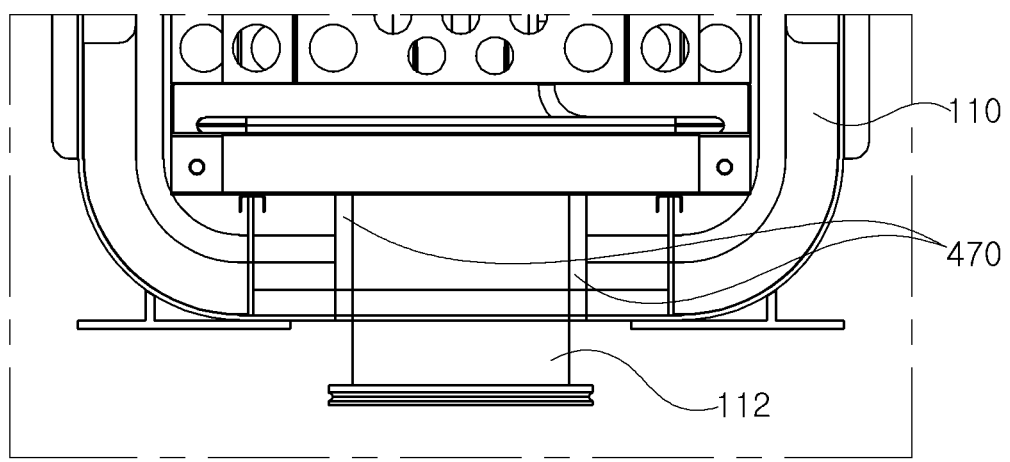
FIG. 10 is an illustrative view illustrating collecting members of an apparatus for collecting a by-product, according to an example embodiment.

FIG. 10 is an illustrative diagram illustrating a third collecting member of an apparatus for collecting a by-product according to an example embodiment.

Referring to FIG. 10, a third collecting member 470 is disposed on the gas outlet 112 side of the internal space within the chamber 110 and serves to remove impurities contained in the gas. As an example, the third collecting member 470 may be configured as a protruding jaw formed in the chamber 110 for removing impurities made of fine particles from the gas. For example, the impurity may be ammonium chloride ($NH_4Cl$) powder. Accordingly, the impurities may remain inside the chamber 110 by the third collecting member 470 formed of a protruding jaw, and the gas from which the impurities have been removed may be discharged externally of the chamber 110.

As described above, since the third collecting member 470 is formed of a protruding jaw protruding from the chamber 110, it is possible to prevent impurities from leaking externally without disturbing the flow of gas.

Figure 11:
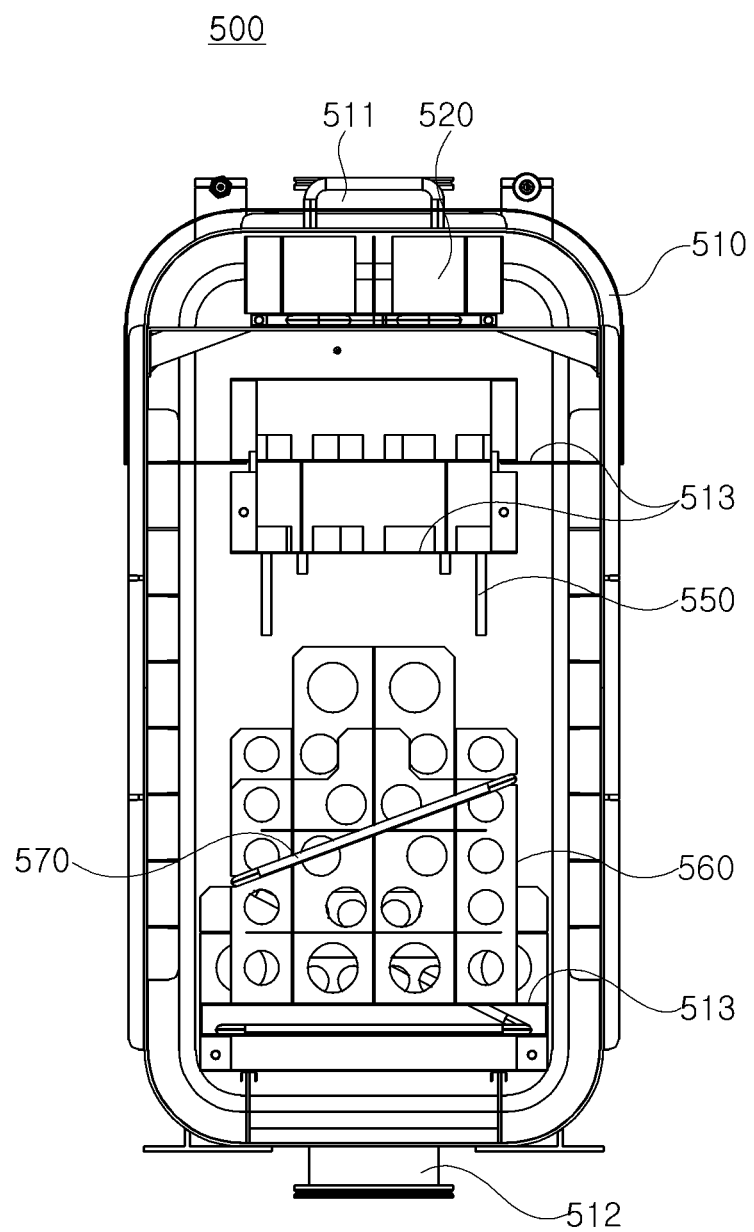
FIG. 11 is a block diagram illustrating an apparatus for collecting a by-product, according to an example embodiment.

FIG. 11 is a schematic configuration diagram illustrating an apparatus for collecting a by-product according to an example embodiment.

Referring to FIG. 11, an apparatus for collecting a by-product 500 may be configured to include a chamber 510, a heater 520, a first collecting member 550, a second collecting member 560, and a cooling pipe 570.

The chamber 510 has an internal space. In addition, the chamber 510 is provided with a gas inlet 511 through which process gas used in a deposition process flows into the chamber 510, and a gas outlet 512 through which gas passing through the internal space within the chamber 510 flows out of the chamber 510. A gas inlet pipe (not shown) and a gas outlet pipe (not shown) may be connected to the gas inlet 511 and the gas outlet 512, respectively. In addition, a pump (not shown) may be connected to the gas outlet pipe so that the gas may flow into the chamber 510 and then flow out. Meanwhile, at least one installation plate 513 may be provided in the chamber 510. The installation plate 513 may be provided with a plurality of openings 513a to facilitate the flow of gas. The shapes and sizes of the openings 513a may vary. Furthermore, various structures may be provided in the internal space within the chamber 510.

The heater 520 is disposed on the gas inlet side of the internal space within the chamber 110. For example, the heater 520 may be disposed within the chamber 510 in a region near or adjacent to the gas inlet 511. The heater 520 may vary a heating temperature in time series. For example, the heater 520 is driven so that the heating temperature is gradually lowered, and a range of the heating temperature varied by the heater 520 may be 250° C. to 350° C. As an example, in an initial operation of collecting by-products, the heating temperature by the heater 520 may be a first heating temperature (e.g., 350° C.). In an intermediate operation of collecting the by-products, the heating temperature by the heater 520 is changed to a second heating temperature (e.g., 300° C.), and in a final operation of collecting the by-products, the heating temperature by the heater 520 may be a third heating temperature (e.g., 250° C.).

Accordingly, by-products are sequentially collected from a lower end portion of the chamber 510 toward an upper end portion.

In the above example, the heating temperature is sequentially lowered in increments of 50° C. (e.g., from 350° C., to 300° C., and to 250° C.), but examples are not limited thereto, and the heating temperature and difference in temperatures may be variously changed. For example, the difference in temperatures between the heating temperature and the plurality of heating temperatures may be variously changed according to conditions such as the size of the chamber 510 and the temperature of the introduced gas.

Figure 12:
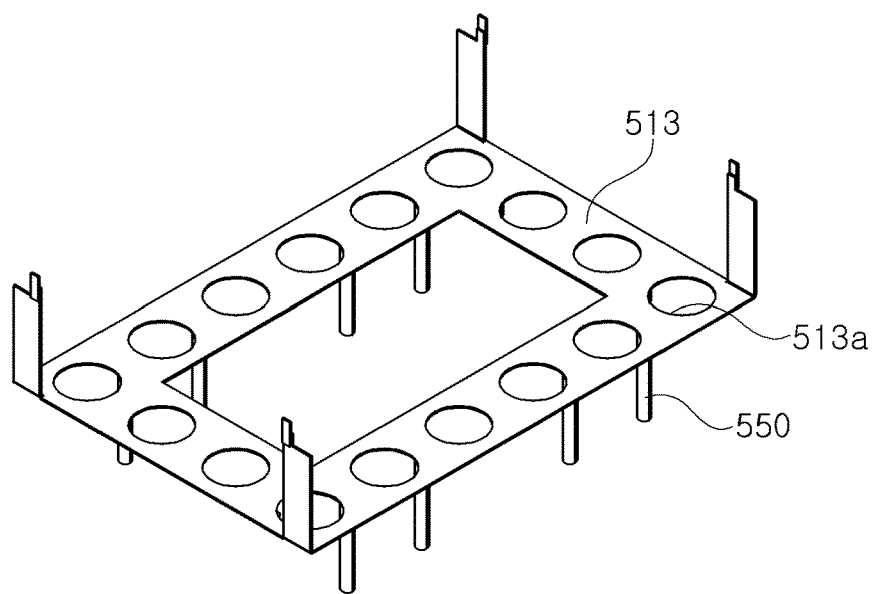
FIG. 12 is a perspective view illustrating a first collecting member of an apparatus for collecting a by-product, according to example embodiments.

The first collecting member 550 is disposed below the heater 520 and may be provided in plural. As an example, the first collecting member 550 may be installed on the installation plate 513 provided in the chamber 510 as shown in more detail in FIG. 12. The first collecting member 550 may have a bar shape and may be disposed in a flow direction of gas. For example, the first collecting member 550 may be disposed such that the longitudinal axis of the first collecting member 550 is perpendicular to a planar surface of the installation plate 513 on which it is installed. As an example, the first collecting member 550 may be regularly arranged, and a distance between the adjacent first collecting members 550 may be constant.

Figure 13:
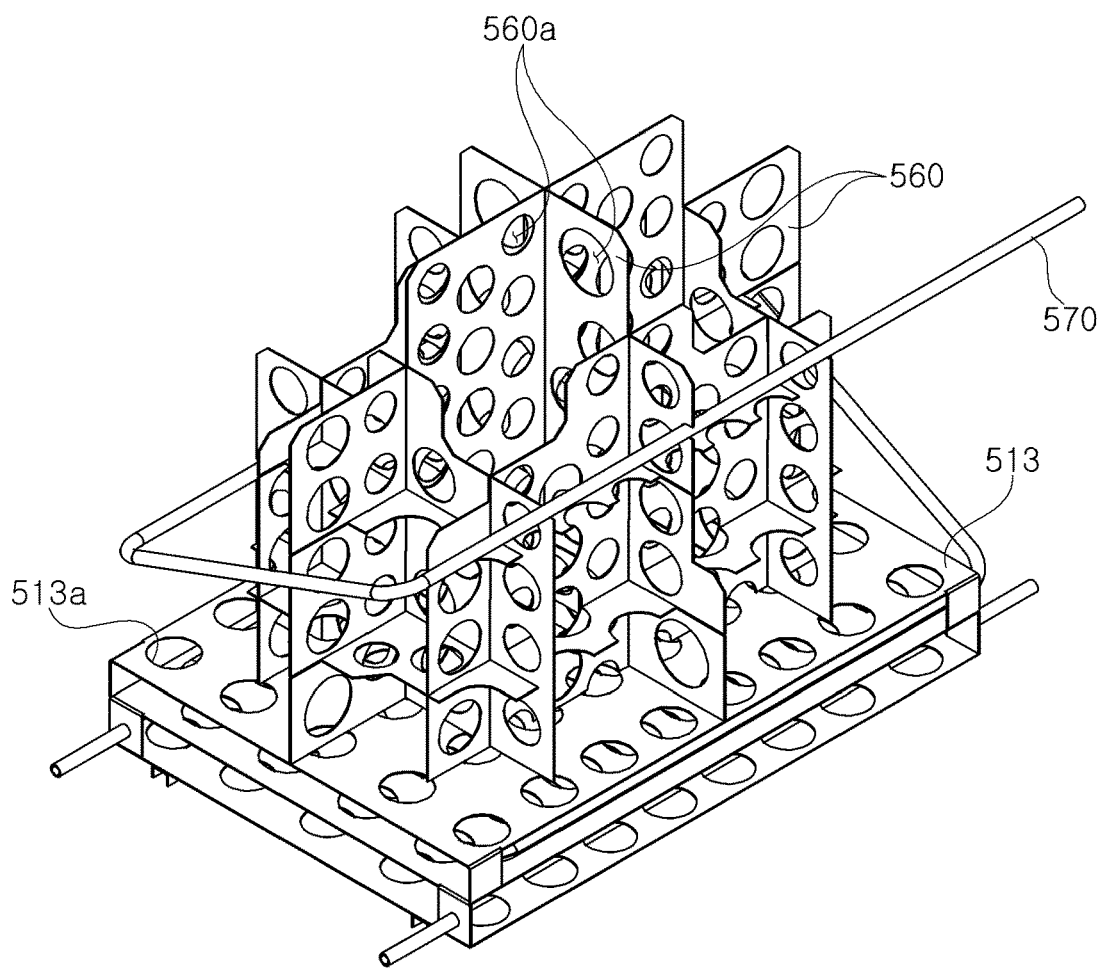
FIG. 13 is a perspective view illustrating a second collecting member of an apparatus for collecting a by-product, according to example embodiments.

The second collecting member 560 may be disposed below the first collecting member 550 and may be provided in plural. For example, the second collecting member 560 may be installed on the installation plate 513 provided in the chamber 510. In addition, as an example, as shown in more detail in FIG. 13, the second collecting member 560 may be disposed in the flow direction of gas, may be disposed such that a plurality of thereof intersect each other, and may be disposed as a structure. For example, the second collecting member 560 may be disposed such that the planar surfaces of the second collecting member 560 are perpendicular to a planar surface of the installation plate 513 on which it is installed. The second collecting member 560 may be provided with a plurality of through-holes 560a for the flow of gas. Further, the plurality of through-holes 560a may be provided with a plurality of types having different diameters.

A cooling pipe 570 is disposed so that at least a portion of the cooling pipe 570 contacts the second collecting member 560. Meanwhile, it serves to more easily collect by-products in the second collecting member 560 cooled by the cooling pipe 570. Furthermore, the cooling pipe 570 serves to lower a temperature of gas discharged externally of the chamber 510.

As described above, the internal space of the chamber 510 can be efficiently used by moving a region in which a collected object is intensively collected through the heater 520 changing the heating temperature in time series from an upper side (e.g., an area within the chamber 510 adjacent to the gas inlet 511) toward a lower side (e.g., an area within the chamber 510 adjacent to the gas outlet 512). Accordingly, it is possible to reduce process interruptions due to operations for maintenance and repair work that must be undertaken by removing the collected by-products.

Figure 14:
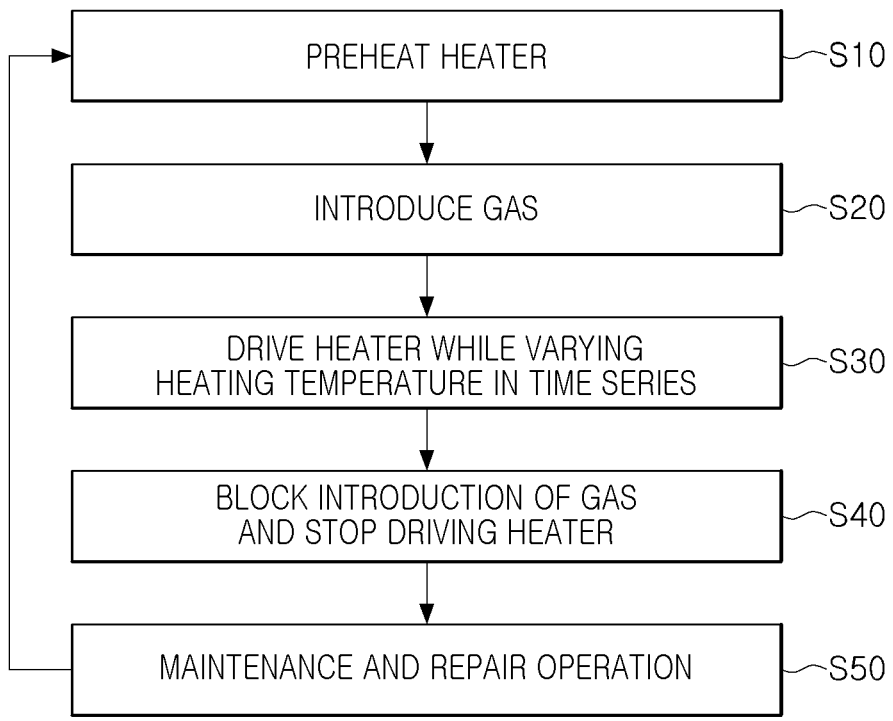
FIG. 14 is a flow chart illustrating a method for collecting a by-product, according to example embodiments.
Figure 15:
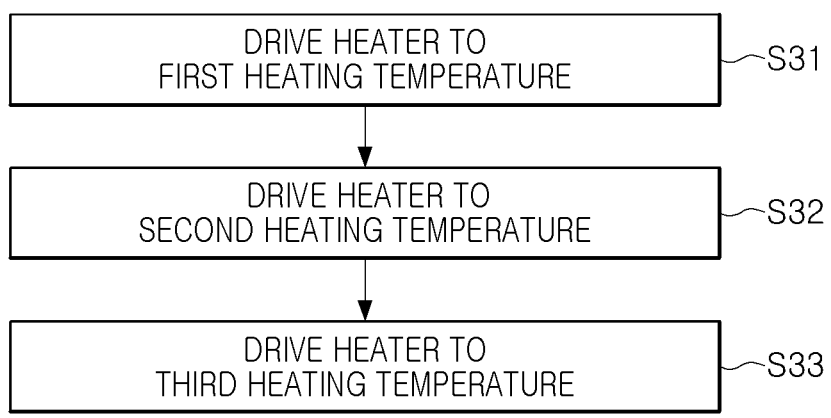
FIG. 15 is a flow chart illustrating an operation of heating a heater.

FIG. 14 is a flowchart illustrating a method of collecting a by-product according to an example embodiment of the present inventive concept, and FIG. 15 is a flowchart illustrating an operation of heating a heater.

Referring to FIGS. 14 and 15, a heater is preheated before gas exhausted from a deposition process is introduced (S10). When the preheating of the heater is completed, gas is supplied into the chamber (S20), and heating of the gas by the heater is initiated. The heater is driven while varying a heating temperature in time series (S30). For example, the heater heats the introduced gas to a first heating temperature (S31). In this case, the first heating temperature may be, for example, 350° C. Thereafter, after a certain period of time has elapsed, the heater heats the introduced gas to a second heating temperature (S32). In this case, the second heating temperature may be, for example, 300° C. Then, after a certain period of time has elapsed, the heater heats the introduced gas to a third heating temperature (S33). In this case, the third heating temperature may be, for example, 250° C.

Thereafter, an operation of the heater is stopped while blocking the inflow of gas (S40), and operations for maintenance and repair of an apparatus for collecting by-products is performed to remove by-products collected in the apparatus for collecting by-products (S50).

Thereafter, when the operations for maintenance and repair of the apparatus for collecting a by-product is completed, the heater is preheated again (S10), and the apparatus for collecting a by-product is driven by the above method.

Meanwhile, as described above, the heating temperature is sequentially lowered in increments of 50° C. (e.g., 350° C., 300° C., and 250° C.), but is not limited thereto, and the heating temperature and difference in temperatures may be variously changed. For example, the difference in temperatures between the heating temperature and the plurality of heating temperatures may be variously changed according to conditions such as the size of the chamber 110 or chamber 510 and the temperature of the introduced gas.

As set forth above, according to the present inventive concept, an apparatus for collecting a by-product capable of reducing process interruptions for maintenance and repair, and a method for collecting a by-product may be provided.

The various and advantageous advantages and effects of the present inventive concept are not limited to the above description, and can be more easily understood in the course of describing a specific embodiment of the present inventive concept.

While example embodiments have been illustrated and described above, it will be apparent to those skilled in the art that modifications and variations could be made without departing from the scope of the present inventive concept as defined by the appended claims.

What is claimed is:

1. An apparatus for collecting a by-product, comprising:
a chamber provided with a gas inlet and a gas outlet and having an internal space;
a heater disposed on a gas inlet side of the internal space within the chamber and configured to vary a heating temperature in time series;
a vortex forming member disposed around the heater;
a plurality of first collecting members disposed below the heater;
a plurality of second collecting members disposed below the first collecting members, the plurality of second collecting members intersecting each other; and
a third collecting member disposed on a gas outlet side of the internal space within the chamber, wherein the plurality of first collecting members comprises a plurality of pillar portions installed on an installation plate provided in the chamber, and a plurality of plates installed on a portion of the plurality of pillar portions to be spaced apart from each other and having different sizes, and wherein the plurality of places directly contact the plurality of pillar portions.

2. The apparatus of claim 1, wherein the heater is further configured to gradually lower the heating temperature of the heater.

3. The apparatus of claim 2, wherein a range of the heating temperature varied by the heater is 250° C. to 350° C.

4. The apparatus of claim 1, wherein each of the plurality of plates has a circular plate shape.

5. The apparatus of claim 1, wherein each of the plurality of plates has an elliptical plate shape.

6. The apparatus of claim 1, wherein the plurality of second collecting members comprises a plurality of 2-1 collecting members disposed on an installation plate of the chamber in a first direction, perpendicular to a direction extending from an upper portion to a lower portion of the chamber, and a plurality of 2-2 collecting members disposed on the installation plate of the chamber in a second direction, perpendicular to the first direction.

7. The apparatus of claim 6, wherein a plurality of through-holes are provided in the plurality of 2-1 collecting members and the plurality of 2-2 collecting members.

8. The apparatus of claim 7, wherein the plurality of through-holes are provided with a plurality of types having different diameters.

9. The apparatus of claim 1, wherein the vortex forming member has a circular tubular shape in contact with an inner surface of the chamber.

10. The apparatus of claim 1, further comprising:
an installation plate provided in the chamber,
wherein the vortex forming member has an arc shape with an outer surface, in contact with the chamber and the installation plate.

11. The apparatus of claim 1, further comprising a heat shielding plate disposed between the heater and the plurality of first collecting members.

12. The apparatus of claim 1, wherein the third collecting member is comprised of a filter for collecting fine by-products or comprised of a protruding jaw protruding from the chamber.

13. An apparatus for collecting a by-product, comprising:
a chamber provided with a gas inlet and a gas outlet and having an internal space;
a heater disposed on a gas inlet side of the internal space within the chamber and configured to vary a heating temperature in time series; and
a plurality of collecting members disposed below the heater,
wherein the plurality of collecting members comprise a plurality of pillar portions installed on an installation plate provided in the chamber and a plurality of plates installed on a portion of the plurality of pillar portions,
wherein the plurality of plates are spaced apart from each other and have different sizes,
wherein the plurality of plates directly contact the portion of the plurality of pillar portions, and
wherein the installation plate is attached to the chamber housing wall.

14. The apparatus of claim 13, wherein the heater is configured to gradually lower the heating temperature according to a driving time.

15. The apparatus of claim 13, further comprising:
a plurality of installation plates in the chamber,
wherein at least one of the plurality of installation plates is provided for installing the plurality of collecting members in the chamber.

16. An apparatus for collecting a by-product, comprising:
a chamber provided with a gas inlet and a gas outlet and having an internal space;
a heater disposed on a gas inlet side of the internal space within the chamber and configured to vary a heating temperature in time series;
a plurality of first collecting members disposed below the heater; and
a plurality of second collecting members disposed below the first collecting members, the plurality of second collecting members intersecting each other,
wherein the plurality of first collecting members comprise a plurality of pillar portions installed on an installation plate provided in the chamber, and a plurality of plates installed on a portion of the plurality of pillar portions,
wherein the plurality of plates are spaced apart from each other and have different sizes,
wherein the plurality of plates directly contact the portion of the plurality of pillar portions, and
wherein the installation plate is attached to the chamber housing wall.

17. The apparatus of claim 16,
wherein the heater is further configured to gradually lower the heating temperature of the heater, and
wherein a range of the heating temperature varied by the heater is 250° C. to 350° C.

18. The apparatus of claim 16,
wherein each of the plurality of plates has a circular plate shape, or
wherein each of the plurality of plates has an elliptical plate shape.

19. The apparatus of claim 16, further comprising:
a vortex forming member disposed around the heater.

* * * * *